United States Patent [19]

Clark

[11] Patent Number: 4,658,094

[45] Date of Patent: Apr. 14, 1987

[54] ENCRYPTION APPARATUS AND METHOD FOR RAISING A LARGE UNSIGNED INTEGER TO A LARGE UNSIGNED INTEGER POWER MODULO A LARGE UNSIGNED INTEGER

[75] Inventor: James M. Clark, Verona, N.J.

[73] Assignee: ITT Corporation, New York, N.Y.

[21] Appl. No.: 716,877

[22] Filed: Mar. 28, 1985

[51] Int. Cl.[4] .............................................. H04L 9/00
[52] U.S. Cl. ........................................ 380/28; 380/30
[58] Field of Search ................. 178/22.08, 22.11, 22.09

[56] References Cited

U.S. PATENT DOCUMENTS

| | | | |
|---|---|---|---|
| 4,211,919 | 7/1980 | Ugon | 178/22.08 |
| 4,405,829 | 9/1983 | Rivest et al. | 178/22.11 |
| 4,424,414 | 1/1984 | Hellman et al. | 178/22.11 |

OTHER PUBLICATIONS

"Digitalized Signatures and Public-Key Functions as Intractable as Factorization" by Michael O. Rabin, Jan. 1979, MIT Laboratory for Computor Science.

*Primary Examiner*—Salvatore Cangialosi
*Assistant Examiner*—Aaron J. Lewis
*Attorney, Agent, or Firm*—John T. O'Halloran

[57] ABSTRACT

There is disclosed an encryption apparatus which apparatus functions to raise a large unsigned integer (B) indicative of message data to a large unsigned integer power E, modulo a large unsigned integer M with each of said integers being as large as N bits wherein the resulting large unsigned integer C is adapted for transmission over an insecure communications channel. The apparatus may likewise operate on a received integer C to recover the decrypted message B. The circuitry includes first logic means which is responsive to the large unsigned integer (B) for successively squaring said integer including means for reducing said squared integers successively by a given modulus M to provide at an output a first value indicative of said squared integer as reduced by said given modulus, selectively operated gating means are coupled to said first logic means and operates to receive bits of a given exponent power E. The gating means applies selected bits of the exponent power to second logic means which are controlled by said gating means to provide the product of said first value as further modified by modulus means for providing at its output the large unsigned integer for transmission over the insecure communications channel. The first and second logic means are constructed such that the required circuit size to perform the computation is significantly reduced in complexity resulting in increased speed together with a substantial reduction in cost.

18 Claims, 18 Drawing Figures

Fig. 8
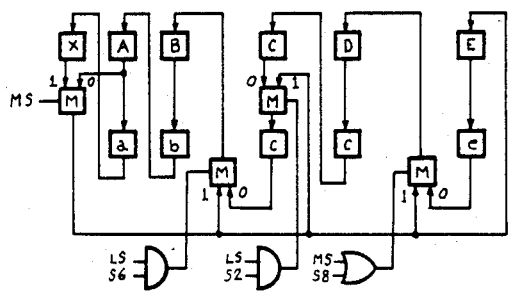
(a)
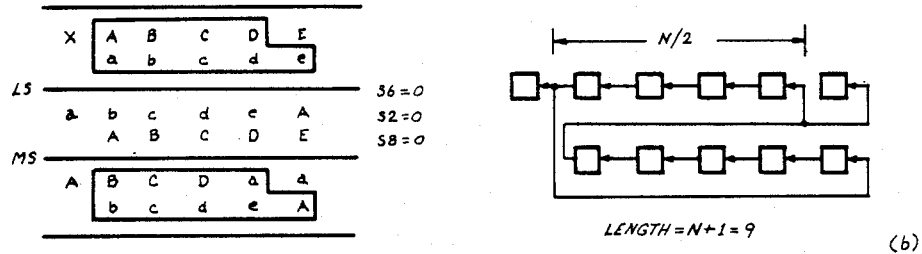
(b)
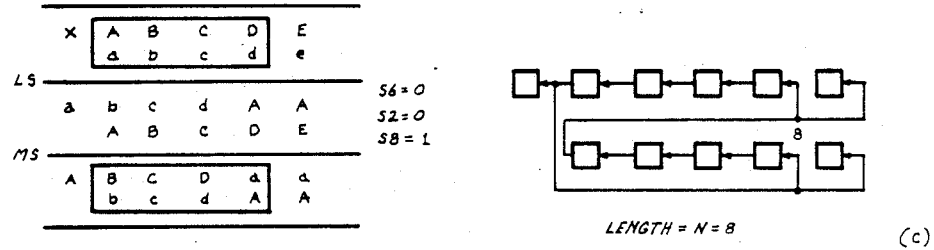
(c)
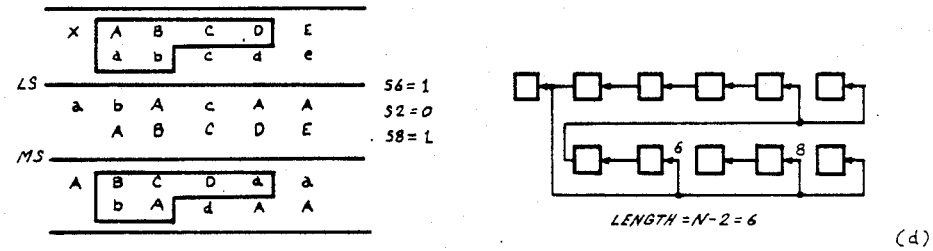
(d)
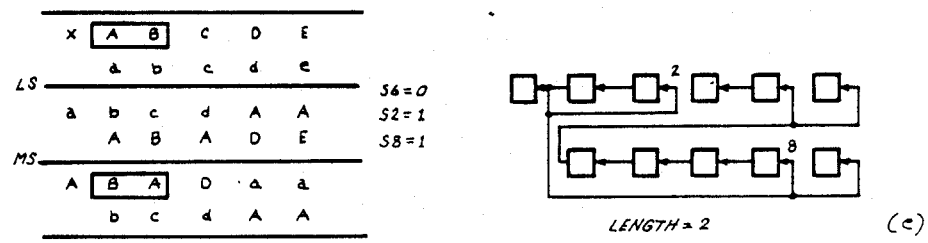
(e)

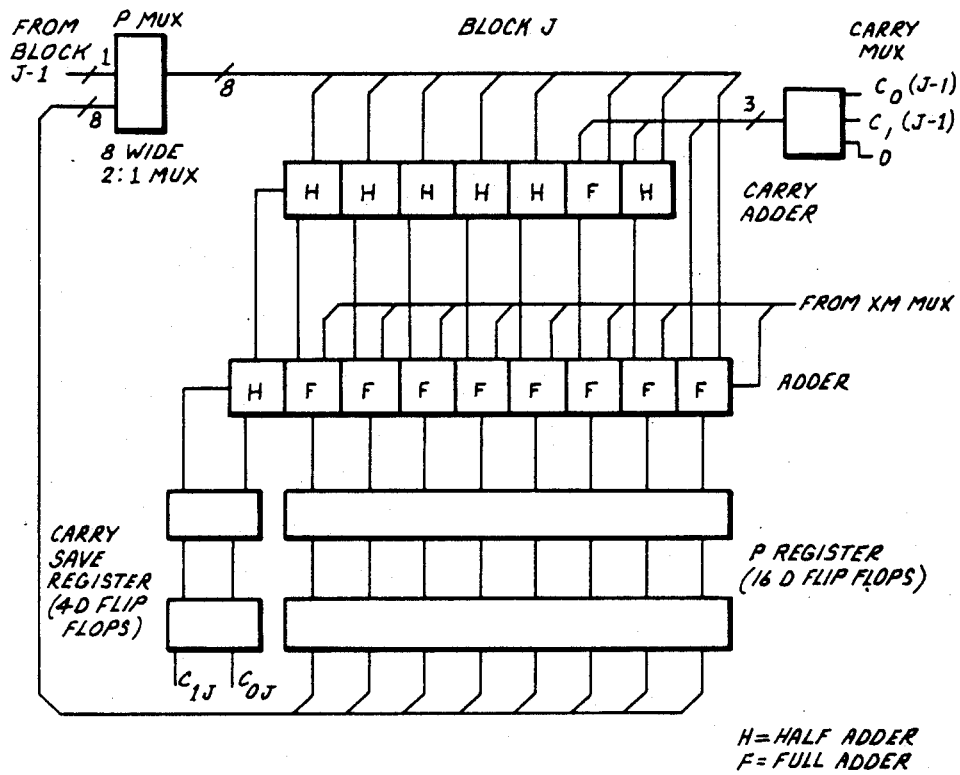
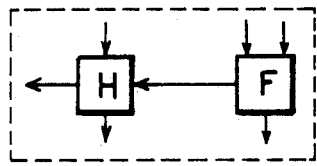
Fig. 14

ENCRYPTION APPARATUS AND METHOD FOR RAISING A LARGE UNSIGNED INTEGER TO A LARGE UNSIGNED INTEGER POWER MODULO A LARGE UNSIGNED INTEGER

BACKGROUND OF THE INVENTION

This invention relates to encryption apparatus in general and more particularly to an arithmetic circuit for computing larger unsigned integers to enable encryption of data for transmission over an insecure communications channel.

Cryptography is the science of transforming messages for the purpose of making the message unintelligible to all but the intended receiver. Essentially, the encryption of data employs such methods in various communication devices to establish communication security, authentication and digital signatures.

As one can ascertain, modern communication systems are being offered which increase the speed and accuracy of communications with lower costs. In any event, these systems present serious problems in regard to security. One way to prevent tampering with such systems and to protect the private information being transmitted requires such data such as credit information, security information and so on to be transformed by encryption techniques so that it becomes unintelligible and, therefore, useless to those who are not meant to have access.

Essentially, encryption is a special form of computation and such systems depend upon the difficulty of computation for their security. These systems affect transformation of 2 data which is so complicated that it becomes beyond the economical means of an unauthorized party to break the code or to reverse the process. Generally, the transformation used to encipher a message typically involves an algorithm and a key. While the general method used by a pair of correspondents may be public knowledge some or all of the key information must be kept secret. The process of transforming a message is to apply the enciphering algorithm to the message where the key is used as an auxiliary input to control the ciphering.

There have been many classical encryption techniques which have been extensively employed in the prior art and essentially consist of substitution ciphers. In any event, there are a class of encryption systems which are designated as public key cryptography systems. In such systems, the deciphering key is different from and not computable from the enciphering key. A person might create a matched pair of such keys and distribute copies of the enciphering key to all his associates while keeping the deciphering key secret. In this manner, the associates can send data to the creator which only he is capable of reading. Public key cryptography systems can also be used to provide digital signatures. Hence a user can create a signature for a message by enciphering it with a private key. Someone else can check the validity of the signature by checking that it deciphers to the message using the signer's public key.

A major type of cryptography system (RSA Cipher) enciphers a message B which is first coded into numeric form by, for example, setting values to each of the letters in the message and then using a public key (e,n) to obtain a ciphertext C as follows:

$$C = B^E \text{ (Modulo M)}$$

That is, C is the remainder of $B^E$ when divided by M. Here all quantities are large numbers which may be several hundred bits long and n is the product of two very large prime numbers p and q. The security of cipher rests mainly on the practical impossibility of factoring the letter n into its parts p and q. The deciphering operation is similar except that the exponent is different:

$$B = C^D \text{ (Modulo M)}$$

Since D depends on p and q, it is extremely difficult to compute D from e and M as it is to factor M. Depending on the number of bits in M, the process becomes extremely time consuming. As an example of the RSA method, the word "IT" can be encrypted as follows using the representation $A=01, B=02, \ldots Z=26$. The number 0920 is indicative of the word "IT". Then with $n = 2773 = 47*59$ and $e = 17$, the cipher text is $C = 920^{17}$ (Modulo 2773) = 948. Using $p = 47$ and $q = 59$, a value of $d = 157$ can be derived from which the numbers can be calculated as $948^{157}$ (Modulo 2773) = 920 which is "IT".

Modular arithmetic plays a large part in public key crytography systems because it turns smooth and continuous and continuously increasing or decreasing functions into discontinuous ones. This introduces a large factor of confusion making it extremely difficult to calculate the inverses. Hence if modularity is added, the value of a function jumps around in a haphazard way. Modular arithmetic is employed in many crytography systems to further disguise information which is already transformed by an enciphering function. Hence when modularity is added to such a system, the value of functions are thrown into complete disarray. As one will ascertain, while the encryption of data is relatively well known in regard to the techniques described above, there is a formidable problem regarding the implementation of such complicated functions. This is based on the tremendous size of the numbers used in regard to the bit length. Hence one requires huge storage capacity and extremely large times in computing encrypted values. As is known, the larger the numbers used, the more circuitry and more space and time are required to calculate functions of this kind. This places a severe limitations on hardware and software and hence such systems are associated with excessive cost. The main point regarding the complexity of such computations is the following. The encryption scheme should have the property that the code breaker's work increases much more rapidly with increasing N (the length of numbers) than does the work of an authorized sender or receiver. Assume the code breaking work is proportional to $N^N$ whereas the encrypting/decrypting work is proportional to $N^3$. Then doubling N from 10 to 20 makes an authorized user's work eight times greater but the code breaker's work $40^{10}$ times greater. Translating work to cost might mean increasing the authorized person's costs from $10 to $80 but increasing the code breaker's cost from say a reasonable amount to an amount which would be more than the national budget of most countries.

For further information regarding such systems and the difficulty in computing and implementing the functions for encryption, reference is made to an article entitled "The Mathematics Of Public Key Cryptography" by Martin E. Hellman and published in SCIEN- TIFIC AMERICAN, August 1979, Vol. 241 #2, pages 146 to 157. This article is extremely informative in giving a detailed history of the development of cryptography and the problems inherent in such systems. The article also contains details concerning Modular arithmetic.

In regard to the problems experienced by the prior art, it is an object of this invention to provide an improved apparatus which is adapted to minimize the required circuit size to perform encryption calculations in a relatively fast time period and to implement an encryption algorithm which is extremely difficult to decipher without authorization.

BRIEF DESCRIPTION OF THE PREFERRED EMBODIMENT

Encryption apparatus for raising a large unsigned integer (B) indicative of message data to a larger unsigned integer (E), modulo a large unsigned integer M, with each of said integers being as large as N bits, wherein the resulting unsigned integer C is adapted for transmission over an insecure communications channel comprising first logic means responsive to said large unsigned integer B for successively squaring said integer, including means for reducing said squared integer successively by a given modulus, to provide at an output a first value indicative of said squared integer as reduced by said given modulus, selectively operated gating means having one input adapted to receive a second value indicative of a given exponent power E and having another input coupled to said output of said first logic means, second logic means having an input coupled to said gating means and operative as controlled by said gating means to provide an output value indicative of the product of said first value as further modified by said modulus means included in said second logic means to provide at said output said large unsigned integer (C) adapted to be transmitted over an insecure communications channel.

BRIEF DESCRIPTION OF THE FIGURES

FIGS. 8a to 8e are a series of diagrams showing structure for handling different modulus sizes.

FIG. 14 is a simplified block diagram of an adder and accummulator structure employed with this invention.

DETAILED DESCRIPTION OF THE FIGURES

Figure 1:
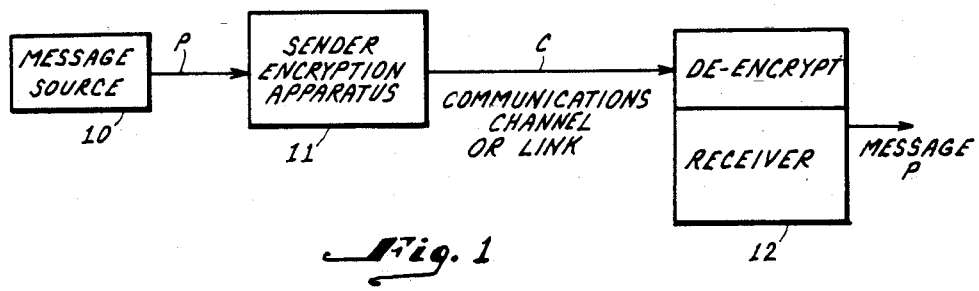
FIG. 1 is a simple block diagram showing an encryption apparatus utilized in a communications channel.

Referring to FIG. 1, there is shown a simple diagram depicting a general cryptography system to further explain the utility of this invention.

Essentially, in a conventional cryptography system someone who wishes to transmit a private message is provided with an algorithm or some general enciphering procedure. The message is derived from a message source 10. At the onset it is understood that the message source may consist of a plurality of different devices such as a computer or a modem and so on. The message data may be voice data which has been transformed into digital data or essentially any type of data indicative of message content. The message P or the data to be transmitted is referred to as "plaintext". The sender has a terminal or circuit module 11 which will operate on the plaintext to generate a ciphertext C. The ciphertext C is then transmitted over a communications channel such as a telephone line, a microwave link and so on which channel is an insecure channel. The receiver 12 receives the ciphertext and operates on the text based on the algorithm or the encryption procedure to recover the plaintext. In a conventional cryptography system, the sender as indicated is provided with an algorithm or a general enciphering procedure G and obtains a key K. The key which must be kept secret is a set of parameters which typically may be a collection of large random numbers which are used for implementing the algorithm.

Accordingly, the algorithm and key together specify the enciphering transformation. This enciphering transformation operates on the plaintext P to develop the ciphertext. The receiver employs an inverse operation in conjunction with knowledge of the key and hence can operate on the ciphertext C to recover the plaintext. As one can see, an unauthorized user who has access to the communications channel and who knows G and the enciphering code will not know the key or K and hence will not be able to decipher the message. This is a conventional system.

In a public key cryptography system there is no need of a secure channel for the distribution of keys. In such a system, each receiver generates two distinct keys, a public key for implementing the public enciphering procedure and a secret key for implementing the public deciphering procedure. Thus the keys are related in the sense that they serve to specify inverse transformations, but given the public key, it is computationally infeasable to derive the secret key. This is inherent in the fact that computing the secret key from the pulbic key would require thousands of years or more, even on the largest computer imaginable. Thus the security provided by the system to be described herein resides in the fact that huge numbers are employed for encryption purposes.

The use of huge numbers immediately places great demands on the circuitry to be employed, and hence, while the mathematical relationships are known, it becomes extremely difficult to implement such encryption processes with the use of conventional computers and hardware. Thus as indicated above, a main aspect of this inventin is to provide an efficient circuit structure which is capable of operating in a relatively rapid time to encrypt data by employing large length integers or numbers. The fundamental computation to be performed by the apparatus to be described is essentially that of raising a large unsigned integer B to a large unsigned integer power E (exponent), modulo a large unsigned integer M. Each of these integers may be as large as N bits. As one can ascertain, the term integer refers to a number which may be represented in binary or some other form and consists of a plurality of bits.

The term "B" which is the large unsigned integer is indicative of plaintext data which may previously have been encyphered or coded and which will be raised to a large unsigned integer as indicated above. Essentially, the use of this alogrithm provides extremely large numbers, each of which has N bits where N is a larger positive integer and the circuit to be described performs this computation within reasonable execution times resulting in a minimum cost design. Essentially, the computation where the large unsigned integer B is raised to the E power (B**E) does not require E multiplication but only 2*N−2, where N is the number of bits in E. The first step is to square the base integer B successively thereby obtaining B2, B4, B8, etc., up to B(2(N−1)). This step requires N−1 multiplications. The use of the double astericks implies that a number raised to a power (such as BE for B raised to the power E), while the use of the single asterisk implies multiplication. Each of the squares produced is then associated with a bit in E as follows.

Associate B with bit zero of E; B2 with bit 1; B4 with bit 2; B8 with bit 3; B16 with bit 4; and so on up to B(2(N−1)) with bit N−1. To compute B**E the product of those squares whose associated bit in E is a 1 is formed. For example, each E is 21 (base 10) or 10101 (base 2) then bits zero, 2 and 4 are ones thereby obtaining

BE=B21=(B)*(B**4)*(B**16)

This final step requires at most N−1 multiplications, so the total computation requires N−1+N−1=2*N−2, multiplications. Thus far the modulo operation has been ignored, and although it is an extra operation, it will actually reduce the total work by reducing the size of the numbers to be multiplied. As will be explained, the modulo operation can be applied once after completing all the multiplictions, but the structure to be described applies the modulo operation as frequently as practical to partial results as the computation is implemented. This is feasible because of the distribution property of the modulo operation. For integers a and b, modulus M and the operators (op) addition, substraction and multiplication, the following relationship is valid.

(a op b) mod M=((a mod M) op (b mod M)) mod M

Because of this property, one can apply the modulus operation after every multiplication to keep the size of the numbers down to approximately 2N bits.

Further, since each multiplication is computed by a sequence of additions, the modulo operation can be applied during the multiplication (with each addition) to keep the size of the number down to approximately 2N bits.

Figure 2:
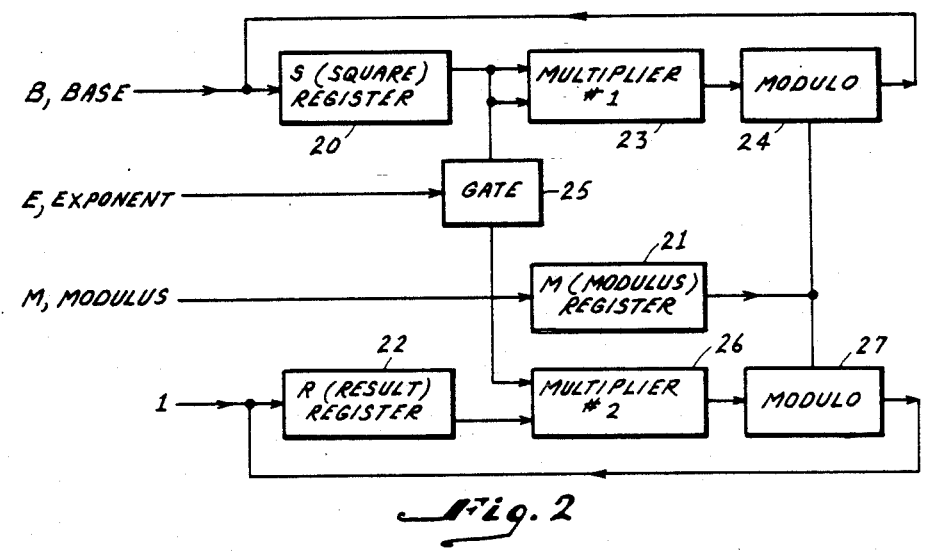
FIG. 2 is a block diagram depicting a structure for computing an encryption algorithm according to this invention.

Referring to FIG. 2, there is shown a sample of a circuit structure which will compute B**E as seen in FIG. 2.

The base value B which is the plaintext data is loaded into a register 20 which is designated as the S register. The modulus M is loaded into a register 21 designated as the M register. A one is loaded into register 22 which is designated as the R or result register. The output of the S register is coupled to a multiplier 23 having an output coupled to a modulo circuit 25 with the output of the modulo circuit 24 coupled back to the input of the S register 20. An output of the S register is further applied to a selectively operated gate circuit 25. Gate 25 receives at its input a bit indicative of the exponent E. The output of gate 25 is coupled to one input of a second multiplier 26 having it other input coupled to the output of the R register 22. The output of multiplier 26 is coupled to a modulo circuit 27 having its output directed back to the input of the R register 22.

As will be explained, the multiplier and modulo circuit as 23 and 24 and 26 and 27 are implemented by combined circuitry, but for purposes of explaining the operation, the structure is depicted as separate modules in FIG. 2. Thus as can be ascertained from FIG. 2, the base value B is loaded into S register 20. The modulus M is loaded into the M register 21 and a one is loaded into the R register 22. The exponent E as applied to gate 25 is introduced later as will be explained.

In one cycle the value in the S register 20 is squared by multiplier 23 and is reduced by the modulus M in the modulus circuit 24. This value is then put back into the S register 20. Thus cycle by cycle, the sequence of squares modulo M is developed and stored in the S register 20. Simultaneously, the product of selected squares Modulo M is developed in the R register 22 whose contents ultimately become the desired result for transmission over an insecure communications channel. For each cycle, one bit of the exponent E is shifted to the selection gate 25 with the least significant bit first. Thus when the exponent bit is a one, multiplier 26 produces the product of the current S and R values as stored in registers 20 and 22. This product is reduced by the modulus M and put back into register 22. When the exponent is a zero, either the output of the gate 25 is made equal to one, or the clocking of the register 22 is inhibited for the same effect.

Figure 3:
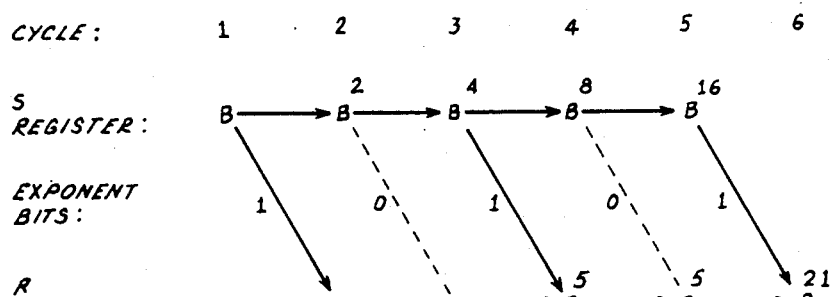
FIG. 3 is a timing diagram for showing the cycle-by-cycle operation sequence of the structure shown in FIG. 2 for the case that the exponent E is equal to 21.

Referring to FIG. 3, there is shown a timing diagram for the above noted example where R=B**21 ignoring the modulus M. The timing sequence between the S and R registers as well as the transfer of the exponent bits is clearly depicted in FIG. 3. Essentially, as indicated above, a large reduction in circuit size can be obtained by combining the multiplier and modulo functions into a single function. In order to accomplish this result, first consider a multiplier implemented as a series of shifts and adds. This is a well known technique which is employed in many conventional multiplier circuits. Consider two numbers to be multiplied X and Y both of which are N bits long. Assme X=5 (10101) base 2 and Y=6 (110) base 2). Then X and Y can be multiplied as shown below. The *2 factors represent shifts. The lines show how X is first multiplied by the most significant bit (MSB) of Y then by the middle bit of Y then by the least significant BIT (MSB) of Y.

```
101*110=( (101*1)*2 + 101*1 )*2 +101*0
       |||              |           |
       ||+-----------------------LSB-of-Y-+
       |+-------------|-----+
       |              |
    +--MSB-of Y--+
         =(   1010    + 101  )*2 +  0
         =( 1111 )*2
         =11110
         =30, base 10
```

If P is the product that is being developed by multiplying using a series of shifts and adds then the algorithm for multiplying X and Y is as given below.

```
P=0
i=1
DO WHILE (i < =N)
    P=P*2 + X*Y(N−i)
    i=i+1
ENDDO
``` where

Y(i) is used for the i-th bit of Y,

Instead of multiplying X and Y, we prefer to rescale X to X/8 and rescale Y to Y*8, so that (X/8)*(Y*8) is computed. The result will of course still be X*Y. (The reason for re-scaling is to assist the prevention of arithmetic overflow, as explained later.) Assume that Y(−1)=Y(−2)=Y(−3)=0, then the algorithm is rewritten as:

```
P=0
i=1
DO WHILE (i < = N+3)
    P=P*2 + (X/8)*Y(N−i)
    i=i+1
ENDDO
```

The last three iterations of the DO WHILE loop will shift Y left three times to compute Y*8.

Accordingly, the modulo operation can be combined with the multiply operation. At each iteration of the DO WHILE loop P is kept close to the true value of P mod M, in the sense that P+L*M will be P mod M, where L is an integer such that −5<=L<=+5. P is kept close to P and M by applying the following "convergence rules":

1. If P< −2**(N−1) then MM=3*M.
2. If P>=2**(N−1) then MM=−3*M.
3. Otherwise, MM=0.

Then let P=P+MM, to keep P in the range near P mod M. Comparing P with +/−2**(N−1) rather than with multiples of M reduces the comparison cost. Rather than subtracting K*M from P, only the top 4 bits of P need to be examined.

Below, the example algorithm is modified to include the convergence rules.

```
P=0
i=1
DO WHILE (i < = N+3)
    IF (P< −2**(N−1)) THEN MM=3*M
    IF (P >=2**(N−1) THEN MM=−3*M
    IF (−2**(N−1)<= P < 2**(N−1)) THEN MM=0
    P=P*2 + (X/8)*Y(N−i) + MM
    i=i+1
ENDDO
```

It is easy to show mathematically that the convergence rules do indeed keep P within a bounded range of P mod M. (The rescaling of X helps to accomplish this.) It is significant that the governing convergence rules maintain the output excursion of P to 0.25M less than the input excursion. This means that small inaccuracies in the arithmetic for computing P do not cause P to leave the range −2.5<P<2.5 and start diverging.

At the conclusion of the DO WHILE loop, P is left in the range −2.5<P<2.5. A simple "cleanup" operation is required to bring P back into the range of the true modulus value, i.e., 0<=P<M. This "cleanup" proceeds as follows: If P is greater than zero, subtract 3*M. Then add M to P successively until P becomes positive. At this point, P will be in the desired range.

An example of the combined multiplication and modulo operation is given below. The example shows the computation of 6*6 mod 5=36 mod 5=1. Lines 2 and 3 of the example show scaling to compute (X/8)*(Y*8). On line 5, note that the threshold T is computed for the scaled M, and is equal to 32. Lines 6 through 11 show the operations in the DO WHILE loop. On these lines MX=X/8 if Y(N−i)=1, and MX=0 if Y(N−i)=0. Note that on line 9, P is over the threshold, so MM=−3*M, whereas on line 10, P is under the threshold, so MM=+3*M. On line 15 P is scaled down to give the final correct result.

```
1. 6 * 6 MOD 5 = 1
2. X=X*8=48 M=M*8=40 --ALLOWS FOR X/8 WITHOUT UNDERFLOW
3. Y=Y*8=48 --INSTEAD OF X*Y, COMPUTE (X/8)*(Y*8)
4. N= NUMBER OF BITS IN M = 6
5. X/8=6 M=40 3*M=120 T=32
6. i=1 Y(N−i)=1 P=0 2*P=0 MX=6 MM=0
   2*P+MX+MM=6
7. i=2 Y(N−i)=1 P=6 2*P=12 MX=6 MM=0
   2*P+MX+MM=18
8. i=3 Y(N−i)=0 P=18 2*P=36 MX=0 MM=0
   2*P+MX+MM=36
9. i=4 Y(N−i)=0 P=36 2*P=72 MX=0 MM=−120
   2*P+MX+MM=−42
10. i=5 Y(N−i)=0 P=−48 2*P=−96 MX=0 MM=+120
    2*P+MX+MM=24
11. i=6 Y(N−i)=0 P=24 2*P=48 MX=0 MM=0
    2*P+MX+MM=48
12. CLEANUP: P−3*M=−72
13. CLEANUP: P+M=−32
14. CLEANUP: P+M=8
15. CLEANUP: P/8=1 -- CORRECT.
```

Figure 4:
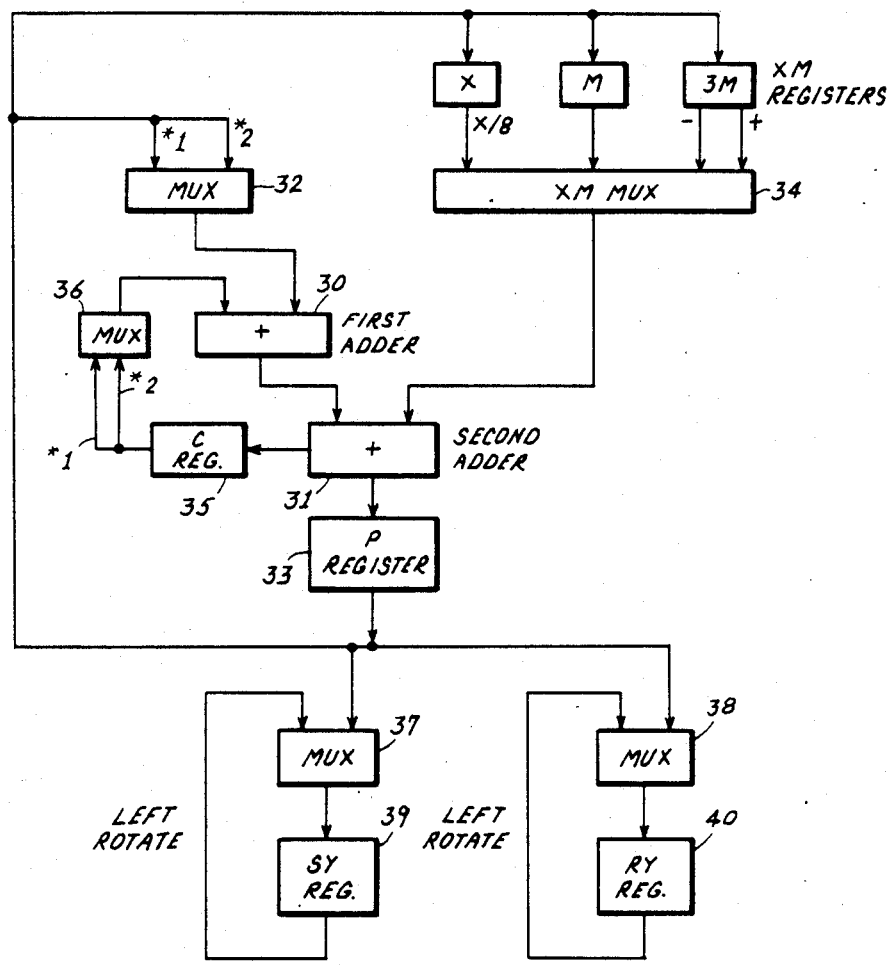
FIG. 4 is a block diagram showing the arithmetic data paths utilized in the encryption apparatus according to this invention.

Referring to FIG. 4, there is shown the data paths by which the arithmetic registers to be described are connected to each other and to the respective adders. In FIG. 4, there are two adders shown. The structures of such adder circuits are well known. The function of adder 30 is for adding the carries, while adder 31 adds values selected by multiplexer 34 to the P (product) register. The arithmetic is divided into 8 bit "slices", and during each cycle, the save carry bits from the next lower slice are added to each P slice using adder 30. Then a selected value is added to P using adder 31. The resulting carry bits are saved in flip/flops to be inputed to the next higher slice on the next cycle. There is a multiplexer 32 which has inputs allowing adder 30 to receive either P or 2*P. Thus as seen, the multiplexer 32 has an output which is coupled to adder 30. There is also a multiplexer 36 allowing adder 30 to receive either C or 2*C. The output from adder 30 furnishes one input to adder 31. The adder 31 has its output coupled to the P (product) register 33. There is shown an additional multiplexer 34 designated as XM multiplexer. This multiplexer has inputs designated as X, X/8, M, +3M, or −3M. These are designated as XM registers and allow adder 31 to receive data from any of these registers. (The "3−3M" input to multiplexer 34 is the inverted output of register "3M".) It is also possible to obtain a zero out of multiplexer 32 or 34 if none of the other outputs are selected.

Shown in FIG. 4 is the C register 35 which has an input coupled to the output of adder 31 and whose output is coupled via a multiplexer 36 to the input of adder 30. The P and C registers 33 and 35 are considered as a combined register with the combined output to be designated as P+C and the shifted version designated as 2P+2C. By saving acrries in the C register, the sum at any time during a calculation is generally not completely computed. Rather, the true sum is the sum of the data in the P and C registers, (written as P+C); and the shifted true sum is the sum of the shifted outputs (written as 2P+2C) of these registers. At the end of the calculation, zero is added to the sum P+C until C becomes zero, that is, P is the complete sum. This is called 'flushing' the carry register.

As a result of these arithmetic data paths, the following arithmetic operations are possible.

```
P+C=0
P+C=P+C            P+C=2P+2C
P+C=P+C+X/8        P+C=2P+2C+X/8
P+C=P+C+M          P+C=2P+2C+M
```

```
P+C=P+C−3M         P+C=2P+2C−3M
P+C=P+C+3M         P+C=2P+2C=3M
```

Any of the registers can be loaded from the P register 33 as will be seen. As further will be explained, the P register 33 is also loaded by a microprocessor, which also controls all of the circuitry. Thus, the microprocessor can load all of the registers, via register P. Shown coupled to the output of the P register are multiplexers 37 and 38, each of which are associated with a register: The SY register 39 for multiplexer 37 and the RY register 40 for multiplexer 38. The SY register 39 and the RY register 40 are left rotated to support the multiplying operation X*Y where the most significant bit of Y is used to choose whether to add X/8 or zero at each step of the shift and add multiplication process.

As is seen in FIG. 4, the arithmetic registers are designated as P, C, X, RY, SY, M and 3M, and they span the bit positions shown below.

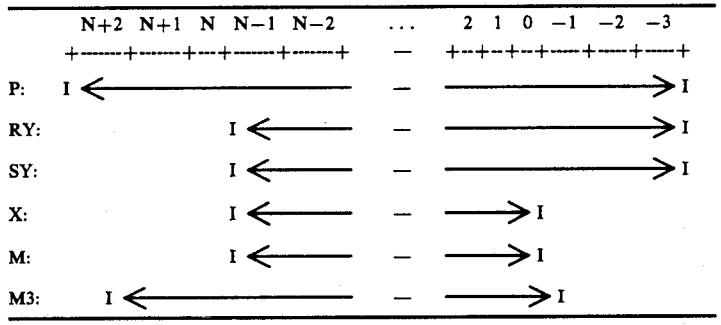

The two registers 39 and 40 (SY and RY) correspond to Y in the computation X*Y. The SY register 39 stores successive squares of the base value B and the RY register accommodates a product of selected squares which is eventually the result R. These registers are analogous to registers 20 and 22 of FIG. 2. The P register 33 is used to accommodate partial products and finally the full product of X times RY or SY modolo M. The M register holds the modulus M and the 3M register holds 3*M.

As will be explained, the exponent E is coupled to the circuitry by a microprocessor one bit at a time in the form of a variation of its command sequence. The bit positions of the C register 35 which is a carry save register, as will be explained, is broken into many pieces. Essentially, the C register has two bit positions per every eight bit positions of the P register, such that the partial sum at any cycle is actually P and C. Some of the registers have more than N bits.

For example, the P register 33 has three extra bits at the high end because the partial sum may have values in the range of −2.5*M to 2.5*M at the time that the P register 33 is compared to the threshold T (=2**(N−1)). This is shown below.

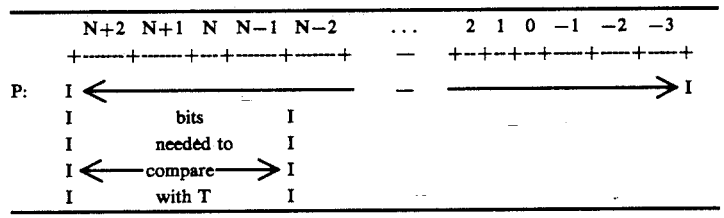

The value in the P register is signed, but the values in all the other registers are unsigned. The P register 33 has three extra bits at the low end because 8/Y is sometimes added to P. Registers RY and SY each have three extra bits at the low end so that in N+3 shift and add cycles X/8 can be multiplied by Y*8 to get the same result as X times Y. Finally, the 3M register has two extra bits at the zero end because it holds the values 3*M, as will be explained. The multiplication operation is "time sliced". This means that the computational circuits are first used to do the shift and add function for the least significant half of the registers, and the same circuits are reused to do the shift and add function for the most significant half of the registers.

As a result of "time slicing", the full amount of data storage is still required, but the amount of computational circuitry is cut in half. The "time slicing" causes each of the above registers to be split in half between the N/2 bit position and the (N/2)−1 bit position. For the P, RY, and SY registers 33, 39 and 40, there are some linking bits that are used to couple an operation on the least significant half to the following operation on the most significant half.

Figure 5:
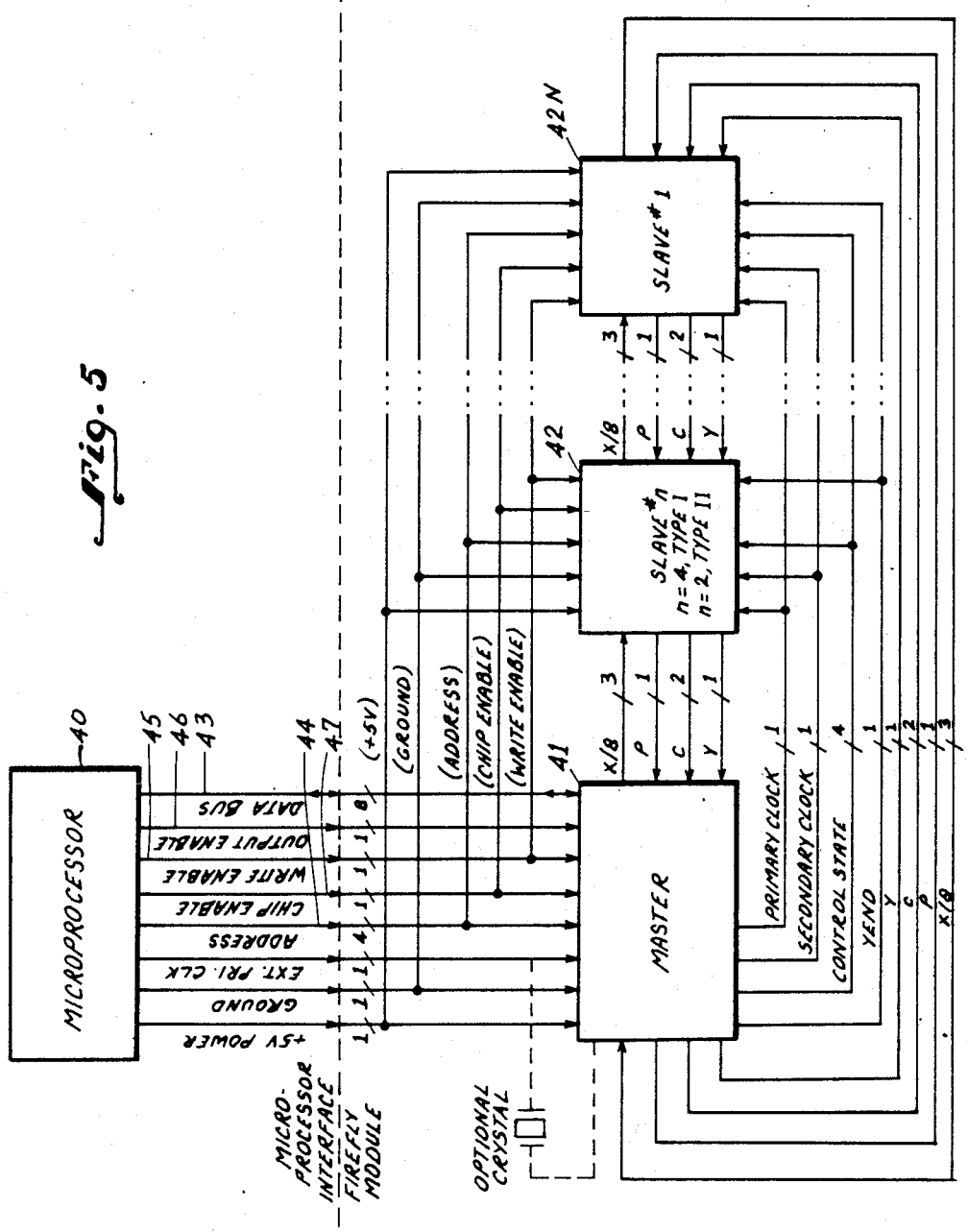
FIG. 5 is a simplified block diagram showing encryption apparatus under microprocessor control according to this invention.

Referring to FIG. 5, there is shown a simple block diagram of the structure of the encryption circuitry according to this invention.

Essentially, the purpose of FIG. 5 is to show the interfacing of the module with a microprocessor 40. The microprocessor 40 may be of any conventional configuration, many of which are available on the market. Essentially, the circuit structure necessary to implement the arrangement shown in FIG. 2 consists of a master module 41 which operates in conjunction with a plurality of slave devices as 42 and 42N. The slave devices can be up to 4 units in number with a minimum of 2 units depending upon the system requirements.

As can be seen from FIG. 5, the various outputs from the arithmetic registers indicated in FIG. 4 are given as X/8, P, C, Y and so on. There are various clock inputs to the modules designated as a primary clock which may operate at a 16 MHz rate, a secondary clock at an 8 MHz rate and a control state bus which may be a 4 bit bus for controlling operation of the modules. The microprocessor has six control inputs to the master and slave devices where 4 bits are address bits, 1 bit is a enable bit and 1 bit is a write bit.

Figure 6:
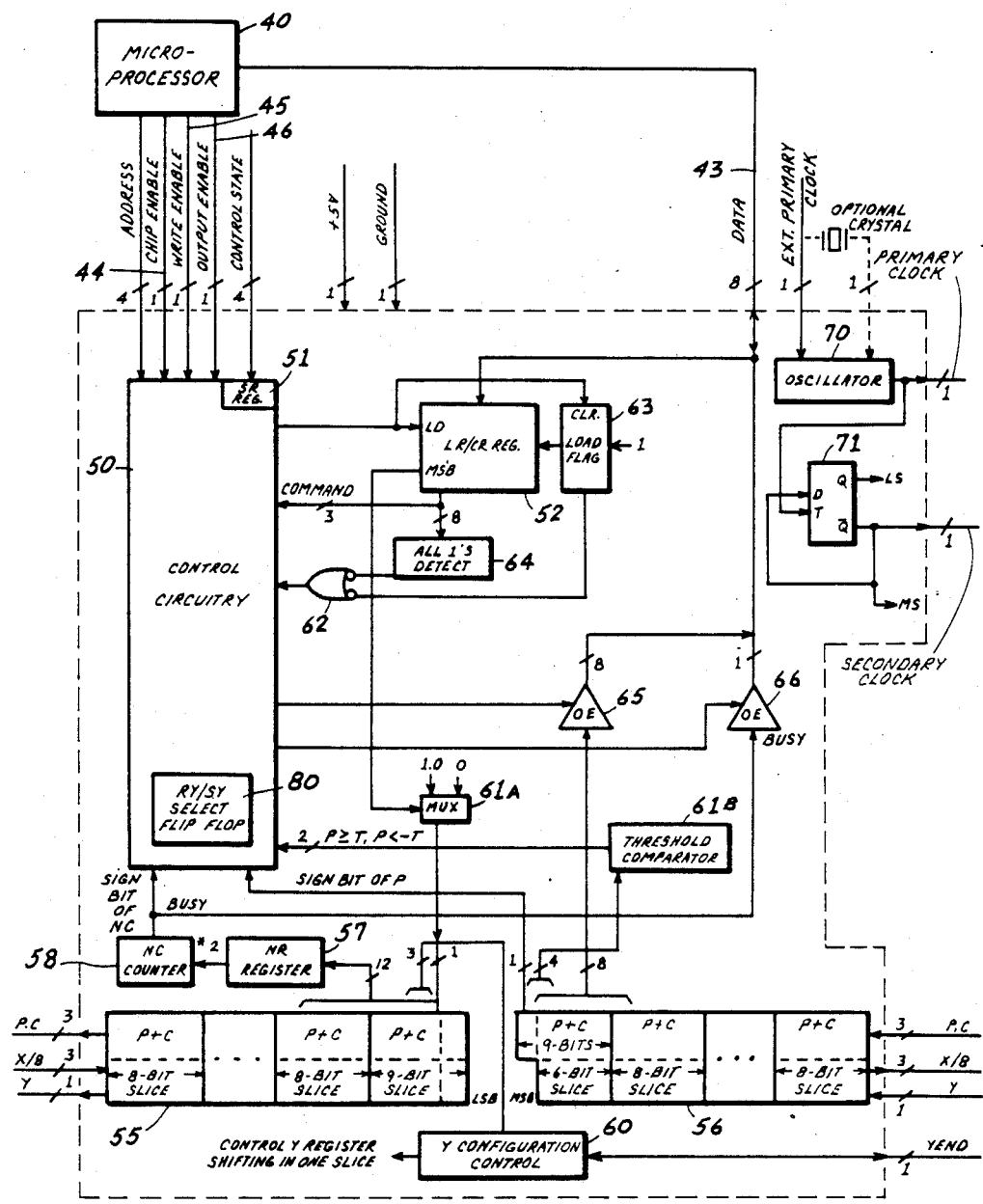
FIG. 6 is a detailed block diagram depicting the operation of a master device utilized in this invention.

Referring to FIG. 6, there is shown a detailed schematic diagram of the master control module 41 of FIG. 5.

Before referring to FIG. 6, it is seen from FIG. 5 that the microprocessor 40 is connected to the master and slave modules as for a simple memory interface. Thus there is a bi-directional parallel data bus 43, a parallel address 44, a write enable control 45, a read or output enable control 46 and a chip enable control 47. All of these are connected to the master devices but only the address, write enable and chip enable are connected to the slave devices.

Referring to FIG. 6, as about indicated, there is shown a detailed functional block diagram of the master device 41 of FIG. 5. The output leads from the microprocessor 40 interface with a control circuit module 50 which module includes an SR register 51 which interfaces with the control state bus directed between the master module and the slave modules as shown in FIG. 5. Coupled to the control circuitry 50 is a register 52 designated as the LR/CR register. The register 52 includes the command (CR) and load (LR) registers which are assigned write addresses and unloading data and reading the busy condition, are assigned read addresses.

These functions are implemented only by the master device. The activation of the chip enable lead 44 by the microprocessor 40 with a read or a write enable 45 and 46 and one address will cause a data transfer on the data bus 43 and cause an associated operation to be performed in the device set of FIG. 5.

As will be explained, there are also 8 pseudo-write addresses that enable data transfers within the device set, but does not write data from the microprocessor 40. Thus there are 11 addresses in all which are assigned to the device set. The master device module contains both the least significant bits of the arithmetic circuits (left hand slices) and the most significant bits (right hand slices). These are contained in registers 55 and 56. Each slice contains all the data paths including registers and adders that have been discussed in conjunction with FIG. 4. It turns out that because of the number of bits in the modules, the least significant and most significant slices are more conveniently constructed as 9 bit and 6 bit slices while all other slices are 8 bits in length. This can be seen from the designations shown in the schematic of FIG. 6 concerning registers 55 and 56. The least significant slice is actually a 6 bit slice with three additional least significant bits appended to handle X/8. In the most significant slice the P register (33 of FIG. 4), and the adder are extended an additional 3 bits to handle a −2.5M to 2.5M range. The least significant 12 bits of the P register are used to load the NR register 57. The NR register 57 is a cycle count register and has its output coupled to the NC counter 58. The NC counter 58 is a 13 bit signed counter. The NR register 57 is used to store the cycle count for automatic multiplying operations. This count is loaded from the NR register 57 into the NC counter 58 with a positive sign (zero) appended to the most significant end.

The NC counter 58 is then decremented until the sign becomes negative. Thus the NC counter controls the number of partial products that are accommodated during a multiplication operation and indicates this to the control circuitry 50. The least significant 3 bits of the P register are used to load the YC register 60 (Y configuration control). The Y configuration control register 60 determines the "loop around" path position for short modulus values. The most significant bit which is the sign bit of the P register is used to test the sign of P. The four most significant bits of the P register are applied to a threshold comparator 61 to test for P>=T and P<−T. The output from the threshold comparator is directed to the control circuitry which is informed of the comparison. For ease of explanation, the first control circuitry considered is the loading and unloading control. When the control circuitry 50 receives a load command from the microprocessor 40, it clears a LOAD FLAG bit which is appended on the least significant end of the load register 52. This starts the LR register 52 shifting left. The most significant bit from the LR register is used to control a multiplexer gate 61 which inputs either a one or a zero to the least significant bit of the adder for P. The bit from the LR register is then shifted into the P register as follows.

$$P+C=2P+2C+LR\_bit\_7$$

As LR is shifted left, ones are shifted into the LOAD FLAG flip flop 63 and the LOAD FLAG bit is shifted into the LR register. When an all ones condition is detected in LR by detector 64 and gate 62, shifting is stopped by means of the control circuit 50. The microprocessor repeats the load command for each 8 bits of data to be loaded (most significant bits first). The control for unloading is simpler than for loading. When the control circuitry 50 receives an unload command, it enables output into data bus 43 of bits N−1 to N−8 via gates 65 and 66 (OE). The microprocessor must issue a load command to shift P 8 bits left, to allow the next 8 bits to be unloaded.

In the upper right hand corner of FIG. 6 there is shown the timing circuitry. An oscillator 70 which may be crystal controlled provides the primary clocking output which is sent to the slave devices to be described. The primary clock is divided by a factor of two by the flip/flop 71 to produce the two timing control signals designated as LS for least significant operation and MS for most significant operation. MS is sent to the slave devices as a secondary clock which is also shown in FIG. 5. As indicated, the flip/flop 71 essentially is a counter which toggles at the clock rate furnished by oscillator 70. It is a "D" type flip/flop where the Q output is LS and, as indicated, controls the least significant "time slice" operations. The Q-Bar output is designated as MS and controls the most significant "time slice" operations.

The CR register, which is combined with the LR register in module 52, is used to accept commands from the microprocessor 40. From the viewpoint of the microprocessor, the CR register is asynchronously loaded from the microprocessor data bus 43. From the viewpoint of the master device, the write enable signal triggers a synchronizing circuit which causes the CR register to be loaded synchronously with an internal clock pulse. The SR register 51 is a state register and is used to send the control state from the master device to the slave devices via the control state bus. The LR which is the load data register is used to load data into the P register one byte at a time. From the P register, the data can then be transfered to any other register. Blocks 55 and 56 are the least significant and most-significant (respectively) ends of the arithmetic logic shown in FIG. 4. (Intermediate-significant portions of this logic resides in the slave devices.)

As indicated above, the Y configuration register 60 is used to control the truncation of the Y registers in that they rotate with the same length as the actual data contained within blocks 55 and 56 and shown in FIG. 4. For the other registers, it is only necessary to align short data to the left and to fill with zeros on the right.

Figure 7:
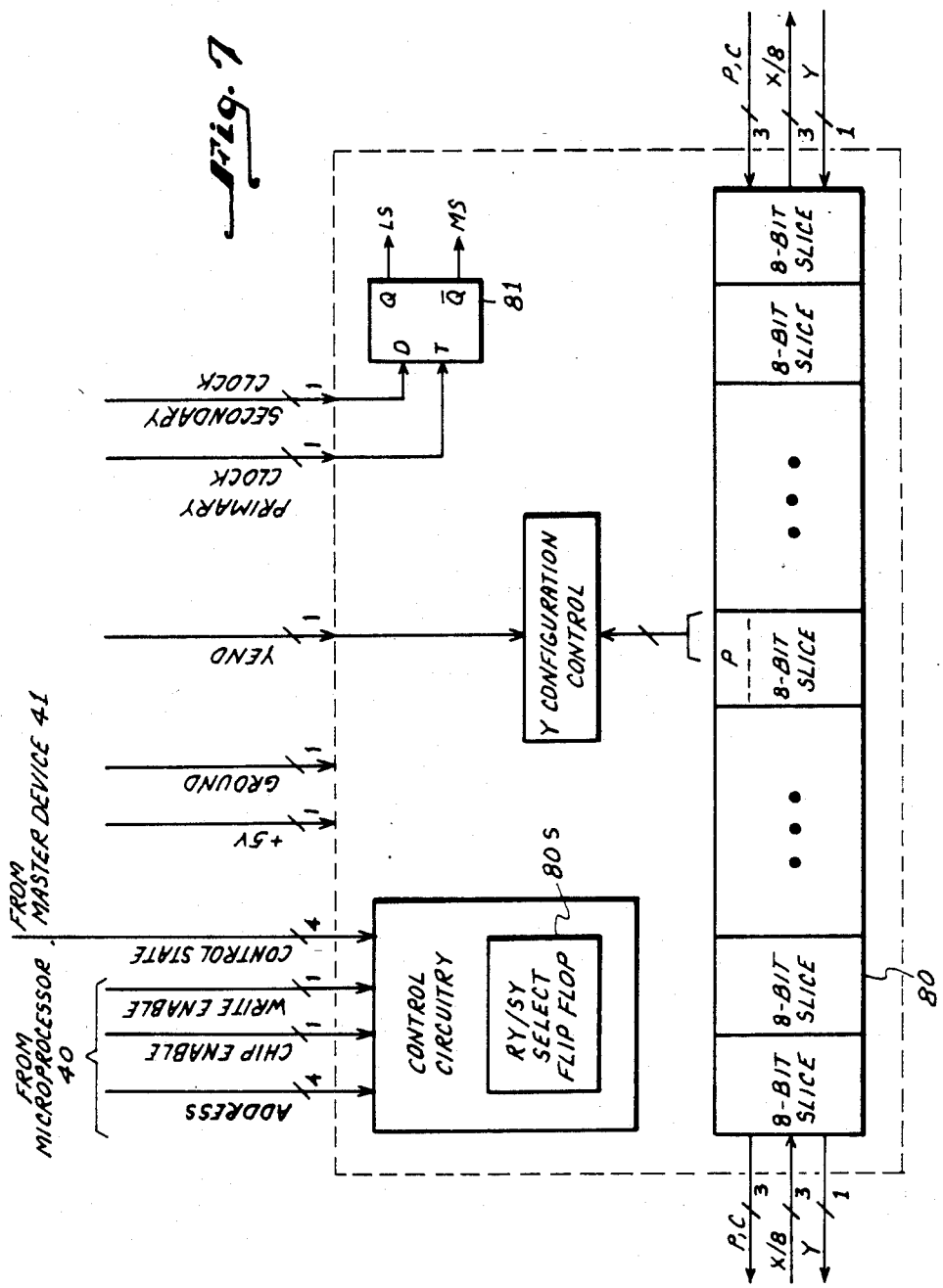
FIG. 7 is a block diagram depicting a slave device according to this invention.

Referring to FIG. 7, there is shown a functional block diagram of a typical slave module as those designated as 42 and 4N of FIG. 5. Essentially, the upper portion of FIG. 7 depicts the control circuitry on the slave devices and shows the inputs from the microprocessor designated as address, chip enable, write enable and the control state bus. The lower portion shows a series of slices in register 80 which comprise the arithmetic circuitry, as for example, shown in FIG. 4. The arithmetic circuitry is the same as that described for the master device except that the slave device circuitry is completely regular being made exclusively of 8-bit slices. The slave device does not require the special circuitry described in conjunction with the master device for least significant and most significant end of the registers. Essentially, the slave circuitry only has to recognize internal register transfer commands from the microprocessor 40 and control states from the master device. The slave timing constitutes a signal flip flop 81 to regenerate the LS and MS signals.

Essentially, in referring to FIGS. 6 and 7, there is depicted the functional block diagrams of both the master and the slave modules as shown connected in FIG. 5. The master control logic generates one of seven control states during each control cycle. A control cycle extends over two clock cycles which is the LS clock cycle for the least significant "time slice" and the MS clock cycle for the most significant "time slice". These seven control states are shown below in register-transfer notation:

| | |
|---|---|
| (P+C=P+C) | (idle/flush) |
| (P+C=2P+2C) | (load/unload) |
| (P+C=0) | |
| (P+C=P+C+M) | |
| (P+C=P+C−M3) | |
| (P+C=P+C+M3) | |
| (P+C=2P+2C+YX,ShNxt) | |

The first of these is the default, or idle, operation, which flushes the carries into the P register. For the second one, the operation in the master is actually:

P+C=2P+2C+LR7,LR=2*LR+LoadFlag,-LoadFlag=1 which supports the load and unload operations. On the last line, "+YX" implies that each device adds X/8 whenever the YEND bit (most significant bit of the selected Y register) is a one. The "ShNxt" designates that the selected Y register should be shifted during the next cycle; that is, this part of the operation is delayed one cycle. The control state is determined by the contents of the command register CR.

Referring back to FIG. 4, it was indicated that the SY register 39 and the RY register 40 are loaded and shifted so that one can take advantage of the "time sliced" architecture of the other registers. This reduces the number of multiplexers and pins needed to support the required loading and shifting operation.

An obvious method is to simply rotate the selected Y register one bit position to the left with one clock pulse, so that if the register contents were previously

| A | B | C | D | a | b | c | d |
|---|---|---|---|---|---|---|---| they would afterward become

| B | C | D | a | b | c | d | A |
|---|---|---|---|---|---|---|---|

This method requires a 2-way multiplexer for each flip/flop of the Y register, to select either the corresponding bit of the P register for loading or the next bit of the Y register for shifting.

To facilitate the parallel loading with a "time sliced" architecture, the most-significant (ms) and least significant (ls) halves of the Y register are stacked to correspond to the organization of the P register. The state prior to shifting is:

| A | B | C | D |
|---|---|---|---|
| a | b | c | d | and the state after shifting is

| B | C | D | a |
|---|---|---|---|
| b | c | d | A | but the shift connections remain the same. It is now apparent that two side-connections are needed at each chip boundary, and two connections are also needed to connect the left end to the right end.

One can rotate the Y register downward in two steps to accomplish the same net result. This corresponds more closely to the motion of the P register, requires less multiplexers, and also requires less side-connection. The loading is done in two clock periods. The initial state is:

| P: | A | B | C | D |
|---|---|---|---|---|
|    | a | b | c | d |
| Y: | x | x | x | x |
|    | x | x | x | x |

(The bits marked 'x' represent unknown or arbitrary data.) Then, after one clock pulse, the following relations are valid:

| P: | a | b | c | d |
|---|---|---|---|---|
|    | A | B | C | D |
| Y: | a | b | c | d |
|    | x | x | x | x | and after the second clock pulse:

| P: | A | B | C | D |
|---|---|---|---|---|
|    | a | b | c | d |
| Y: | A | B | C | D |
|    | a | b | c | d |

That is, as the P register is rotated vertically, it is shifted vertically into Y.

Rotation of Y may also be done in two steps.

The Y register is rotated vertically in two steps such that the final result is the same as the one-step horizontal rotation shown before. This requires an additional flip flop. In the initial state, it is marked 'x' to show that we don't care about its initial value:

| x | A | B | C | D |
|---|---|---|---|---|
|   | a | b | c | d |

On the first clock pulse, all bits are shifted downward and the bits from the bottom of each column are moved to the top of the next column to the left, except that the TOP of the leftmost (full) column is moved to the top of the rightmost column:

| a | b | c | d | A |
|---|---|---|---|---|
|   | A | B | C | D |

Notice that the auxiliary flip/flop has captured bit 'a', which would have otherwise disappeared. On the second clock pulse, the shifting is the same except that the bit in the auxiliary flip/flop is moved to the top of the rightmost column:

| A | B | C | D | a |
|---|---|---|---|---|
|   | b | c | d | A |

Notice that, ignoring the auxiliary flip/flop, the result is the same as the one-step horizontal rotation, but only one side-connection is now required at each device boundary. Also, by comparing the rotate operation with the load operation, it is evident that the inputs to the bottom row of flip/flops are the same for both operations. Thus, multiplexers are needed only for the top row of flip/flops. The control for these depends on whether one rotates or loads the Y register. A multiplexer is required to select which bit at the left end of the array will be moved to the right end. The control in this case depends on whether the clock period is associated with the ls or ms half of the two-clock cycle.

The same design can be used for both the RY and the SY registers, except that in the case of the SY register, the input at the right end of the register is not needed. Since both registers are never shifted at the same time, the same side-connection can serve both Y registers. To do this, a multiplexer is added at the output pin which selects the output of the currently used Y register, as indicated by the Y_sel latch 80 of FIGS. 6 and 7. The input pin connects to both registers, and is ignored by the inactive register. The cost of the extra multiplexer is much less than a side-connection.

As indicated, it is convenient to add three zeros to the least significant (ls) end of the Y value to support the (X/8)*(8*Y) form of the multiplication. This is done by decoding the last three states of the cycle counter to force the zero value (and disable the Y shifting), or by actually putting three extra zeros in the Y register. The extra bits must be added to the right end of the bottom (ls) row, but to allow the vertical-shifting scheme to remain intact, there is added on an equal number of bits to the right end of the top row. On the first clock pulse, the bit from the left end to the top of the rightmost (new) column is shifted but on the second clock pulse, the bit from the left end is moved to the same column as before (the original rightmost column).

When the bit-length of the modulus m (and of the base b) is less than the arithmetic size of the device set, some adjustments are needed to perform the operation. First, load zeros after the m and b values, to left-justify the data within the device set. The time to load the data is not shortened, but a small count value is loaded, which shortens the time for each multiplication cycle. The P, X, SY, RY, M, and M3 values will all have the same number of extra zeros on the right. The arithmetic will be the same except that the rightmost end of the adder will be always adding or substracting zeros. The complement-and-add-carry method of subtracting produces different activity for subtracting zeros than for adding zeros, but the result is correct in either case.

However, the rotation of the RY register must be truncated also. The need to truncate the RY register arises from two design choices. The first is that the P register is shared for both Square and Result accumulation, separate Y registers are used for the Square and Result, rather than share one Y register and use separate P registers. This choice is made to reduce the number of multiplexers. The second choice is to keep the execution time independent of the data by computing a hypothetical next result value and then discarding it for zero bits of the exponent. Together, these choices require that the RY register contents be preserved when shifted. The rotation preserves the data because after N+3 shifts, all bits return to the original positions.

The RY register can be truncated to various shorter lengths by adding multiplexers at certain positions which we want to operate as rightmost positions. If the multiplexer inserts the left-end bit instead of the normal next bit during the first (ls) clock period at such a position, the rotation will be truncated at that position.

The FIGS. 8b–e illustrate four cases of register adjustment for the case that N=8 and where the length is (b) extended to 9 or (c) left at 8, or (d) truncated 6 (more than half of N), or (e) truncated to 2 (less than half of N).

FIG. 8a shows the special multiplexers, but omits the load multiplexers for the sake of clarity. For the remaining figures, the table at the left gives the state of the register before shifting, and after the first and second clock pulses. The diagram at the right gives the equivalent data flow for a one-step shift.

The control data (S[n] bits) is set up in a Y Configuration register, which requires only a few bits for each device, and can be loaded from the P register, that is, from the rightmost part of the P register on each device.

Figure 9:
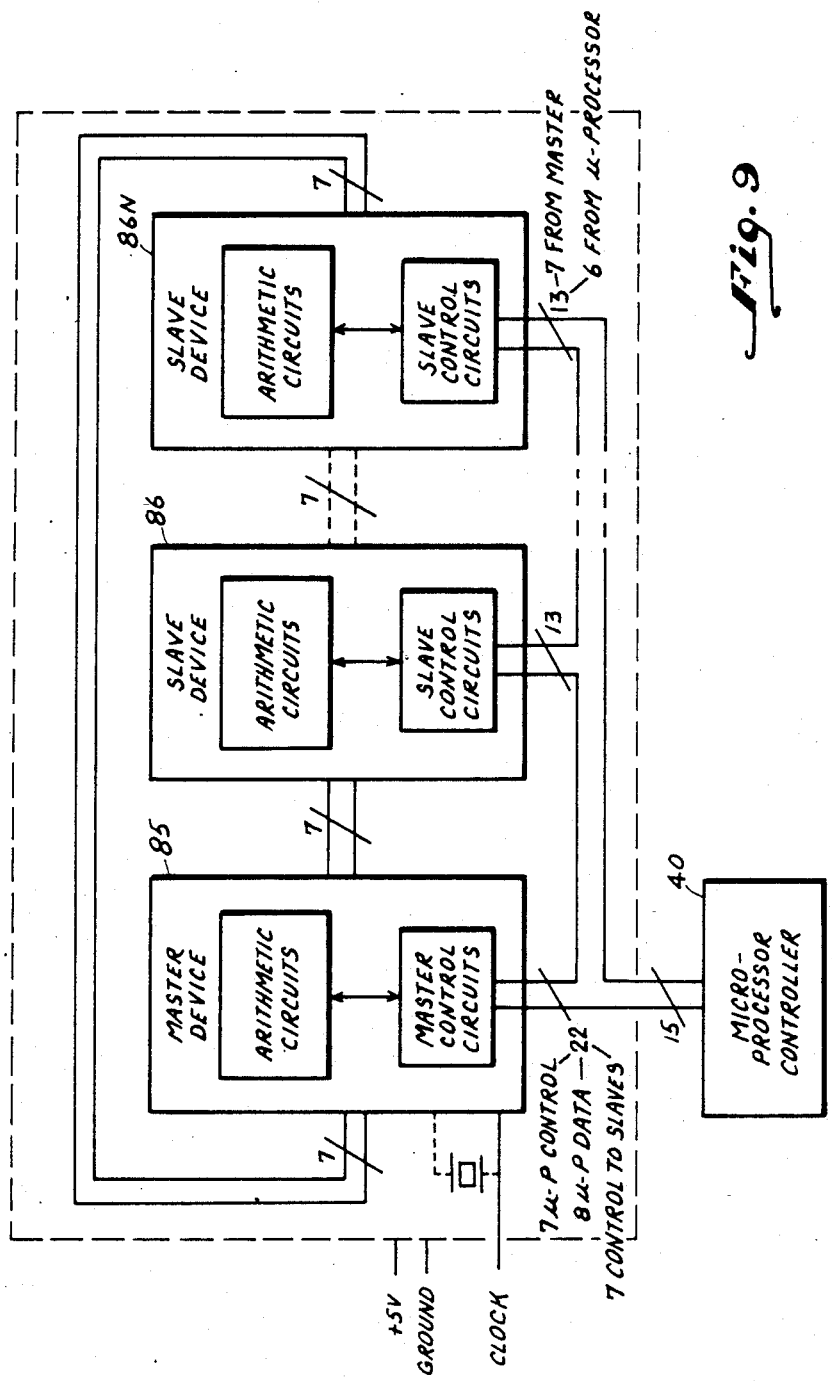
FIG. 9 is a block diagram of an encryption apparatus system according to this invention and is similar to the structure shown in FIG. 5.

Referring to FIG. 9, there is shown a block diagram which is similar to the diagram depicted in FIG. 5 but which shows each of the units which is the master device and the two slave devices including the control circuits and the arithmetic circuits and as interfaced with the microprocessor 40. The purpose of the diagram is to give still a clearer conception of the arrangement. As indicated above, the entire processing circuit for performing encryption consists of one master device 85 and up to four slave devices as 86 to 86N. The control of the device is by the microprocessor 40 which is a standard 8 bit microprocessor. The master device 85 consists of arithmetic circuits as those of FIG. 4 and master control circuits as shown in FIG. 6. Likewise, each slave device as 86 to 86N consists of arithmetic circuits identical to those in the master device and slave control circuits.

Figure 10:
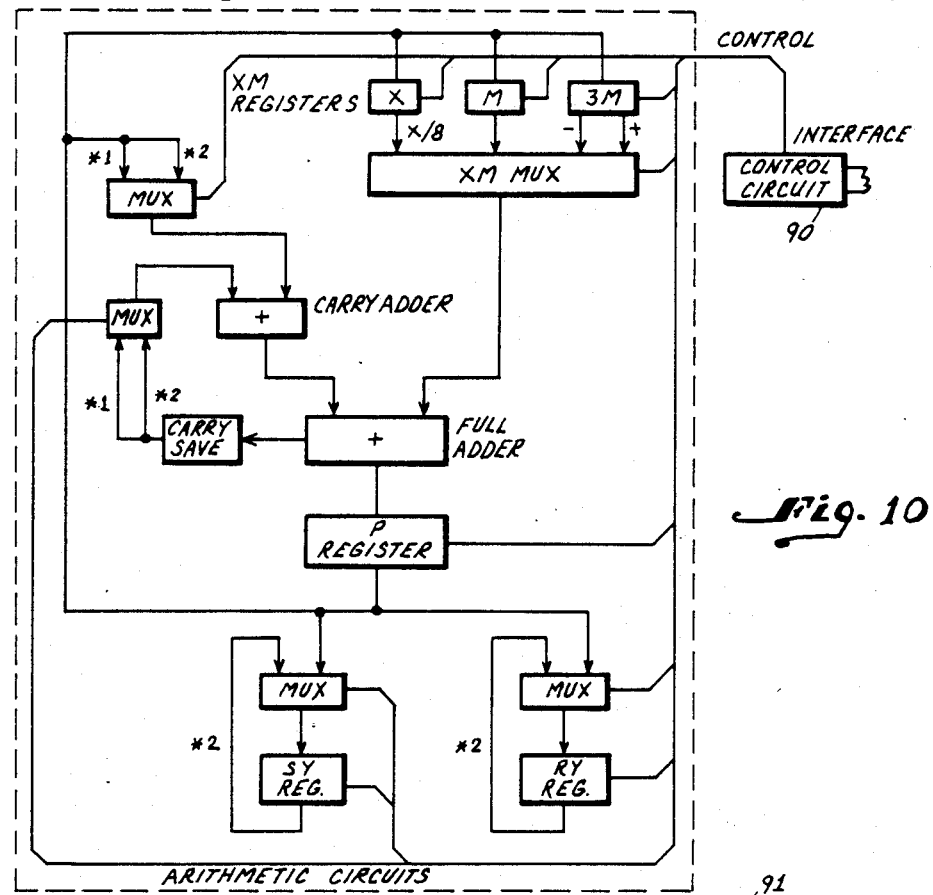
FIG. 10 is a block diagram depicting the structure of FIG. 4 as coupled to a control circuit.

The master and slave device are similar in design. The master control circuits as indicated in FIG. 6 as module 50 is a sequence controller which interprets commands from the microprocessor 40, while for the slave device the control function simply passes control signals from the master device and the microprocessor 40 to the slave's arithmetic circuits. The "arithmetic circuits" in FIG. 9 correspond to blocks 55 and 56 in FIG. 6 and block 80 in FIG. 7. Referring to FIG. 10, there is shown a block diagram of the arithmetic circuitry similar to the circuitry shown in FIG. 4 with a direct indication of how the various modules of FIG. 4 interface with the associated control circuitry as 90 of the master and slave control units.

As indicated, a main object of this invention is to perform the mathematical operation of raising an integer to a power and then performing a modulus function where the functions are combined to reduce circuitry. Essentially, the power function is reduced to a series of multiplications and modulo operations (similar to divisions) which are reduced to a series of shift and add operations. In order to accomplish further reductions in circuit complexity "time slicing" techniques are used. The circuitry shown in FIG. 10 is time-shared as described above.

Figure 11:
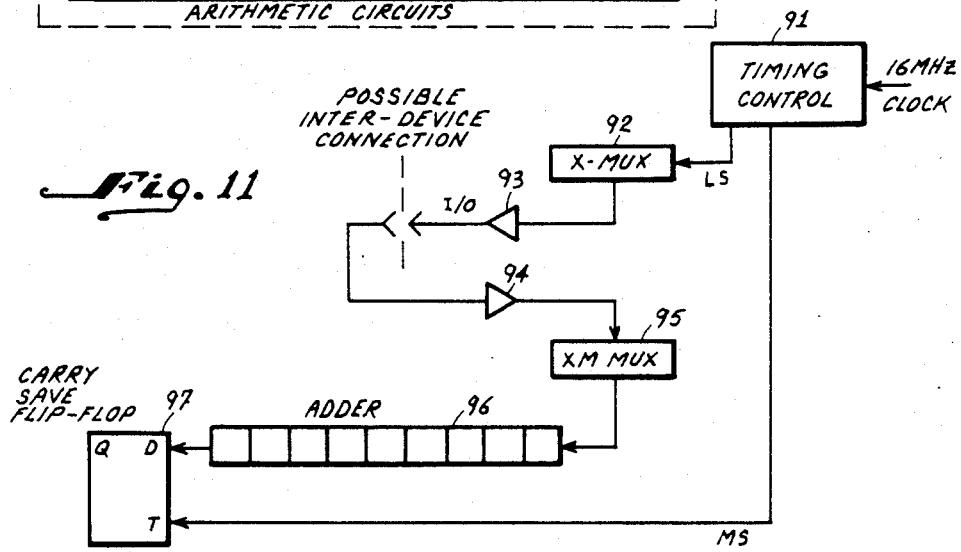
FIG. 11 is a simple block side diagram useful in determining propagation delay in an arithmetic circuit as shown in FIG. 4.

Referring to FIG. 11, there is shown an arithmetic circuit which essentially shows only the longest path of logic delay from FIG. 10 and is used to indicate the worst propagation delay, which must be less than the clock cycle. Each multiply/modulo operation consists of about N add-and-shift cycles; and each add-and-shift cycle is divided into four clock cycles. The worse case propagation delay path is from the timing control flip flop 91 through the X multiplexer 92, next through input-output circuits 93-94, through the XM multiplexer 95 and then through nine levels of ripple carry evidenced by the adder 96 and finally the setup time for the carry save flip flop 97. This shows that the speed is mainly dependent on the width of the carry-save slices (shown as 8 bits) and the inter-connection delay.

Figure 12:
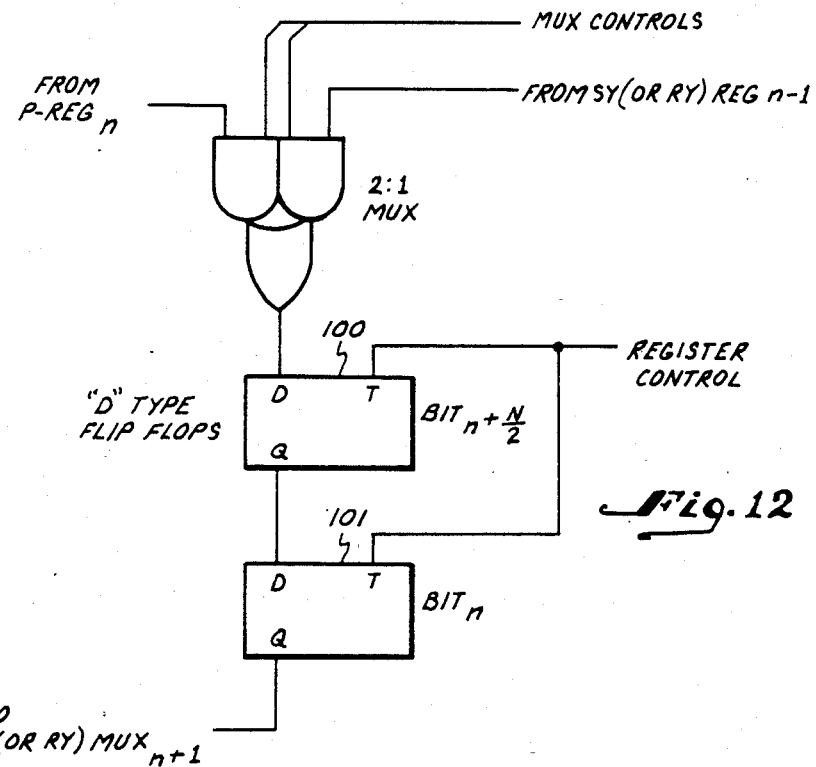
FIG. 12 is a simplified block diagram of circuitry needed for register stages employed in this invention.

Referring to FIG. 12, there is shown a logic diagram of a typical piece of a "time sliced" register (either the SY or RY register). In regard to FIG. 12 only two bits of storage (one bit of width) of the register is shown, but this design is iterated across N bits to achieve the desired length arithmetic operation. This design is utilized to implement the RY and SY registers as shown in FIGS. 4 and 8. Considering an operation which is N bits long, N/2 pieces as shown in FIG. 12 are implemented because each contains two bits of storage. The operation is broken up into a least significant and most significant part so that in any piece "M" bits M and M+N/2 are stored.

The SY and RY registers are each the equivalent of ten logic gates four per flip/flop and two for the multiplexer. As seen from FIG. 12, the multiplexers as 37 and 38 of FIG. 4 controls two "D" type flip flops 100 and 101 which essentially store the required bits.

Figure 13:
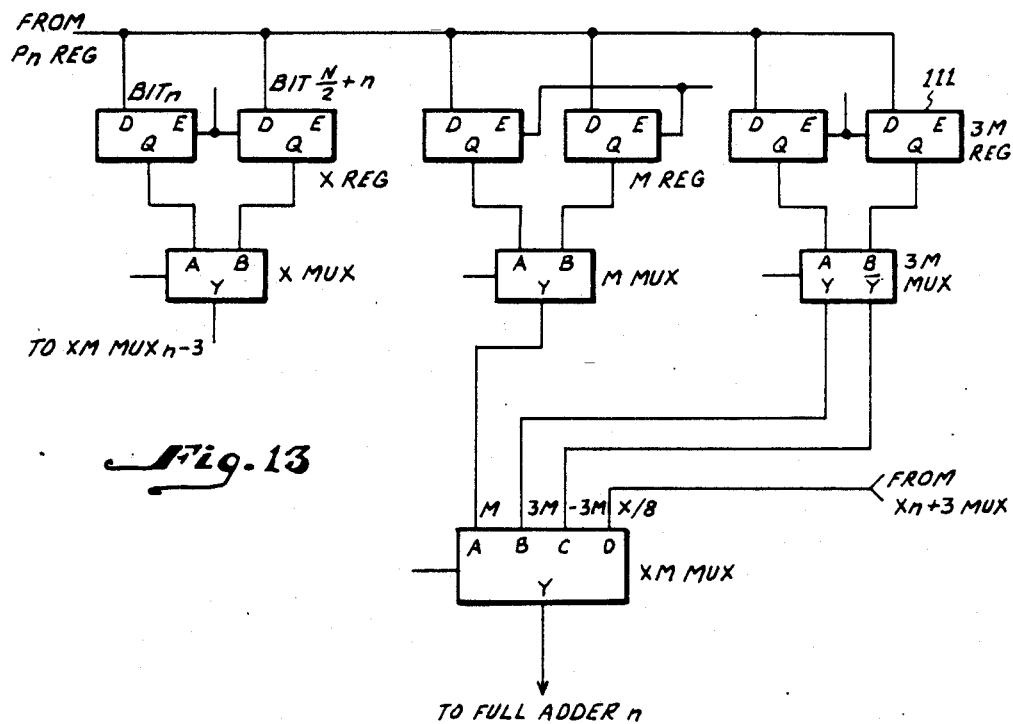
FIG. 13 is a block diagram of a register and multiplexer configuration used in this invention.

Referring to FIG. 13, there is shown a schematic of the "time sliced" XM register and XM multiplexer design as shown in FIG. 4. As indicated, X (the base) and M (the modulus) and these values remain constant during any calculation. Since the values are not time critical, the circuit employs low gate count latches instead of "D" flip flops. Hence modules 110 and 111 are latches.

In FIG. 13, only the data flow paths are shown for clarity. Values from the P register are loaded into the XM and 3M registers at the start of the calculation. X/8 and 3M as indicated above are needed to insure that the multiply/modulo operation converges.

Referring to FIG. 14, there is shown a schematic diagram of an 8-bit carry-save slice of the adders and P and C registers as depicted in FIG. 4 as 30, 31, 33 and 35. The circuit uses both half adders and full adders; these are designated as H for the half adder and F for the full adder. The data flow is downward and to the left.

The multiply and modulo functions are interleaved in a cycle. Thus two additions are done per cycle. In the circuit shown "flushing" the carry bits requires N/8 additions with all inputs to the adders being at zero except the P and C register inputs. Since two additions are done per cycle N/16 cycles are required to flush the carries, that is, to sum all the carry bits into the P register.

Beneath FIG. 14, there is shown a block diagram indicating the actual input leads between the full adder F and the half adder H. Thus as one can see, the output from the full adder is coupled to an input of the half adder. The half adder has two outputs, one of which is directed to the next half adder and the other is directed to an input of a full adder, as the case may be. The full adder has two input terminals as well. The purpose of the small diagram associated with FIG. 14 is to show the carry connections between adjacent adders and, therefore, to make FIG. 14 clearer.

The above described operation is well within the ken of those skilled in the art, and based on the system architecture, one skilled in the art could implement the encryption apparatus according to the above noted structure. In any event, the system as indicated is controlled in operation by a microprocessor 40. The following dissertation is a description of the commands issued by the microprocessor 40 to the master and slave modules to implement the raising of a large unsigned integer to a larger unsigned integer power, modulo a large unsigned integer.

| COMMAND | HOW INVOKED | COMMAND DESCRIPTION |
|---|---|---|
| A. Transfer Commands | | |
| (M+P) | Pseudo-write to addr TBD | Load the M (modulus) register from the P register. |
| (M3=P) | Pseudo-write to addr TBD | Load the M3 (3*modulus) register from the P register |
| (NR=P) | Pseudo-write to addr TBD | Load the NR (cycle count) register from the P register. Normal load value is N+2. |
| (YC=P) | Pseudo-write to addr TBD | Load the YC (Y configuration) register to set truncation of YR rotate function. |
| (Y=P) | Pseudo-write to addr TBD | Load the Y register from the P register. Either RY or SY must have been previously selected. |
| (X=P, SY=P, sel-RY) | Pseudo-write to addr TBD | Load the X register from the P register. Then load the SY register from the P register. Finally, select the RY register. |
| (RY=P,sel-SY) | Pseudo-write to addr TBD | Load the RY register from the P register. Then select the SY register. |
| (sel-SY) | Pseudo-write to addr TBD | Select the Sy register. |
| B. Arithmetic Commands: | | |
| (P+C=0) | Write TBD to CR, at addr TBD | Clear the P and C registers. |
| (start_ multiply: NC=2*NR+1 | Write TBD to CR, at addr TBD | Start the multiply automatic operation going by loading the cycle counter (NC) from the cycle count register (NR). |

NR is normally loaded with the value N+2, and the command sets the counter NC to 2*N+5. Whenever NC is non-negative, it counts down; thus it counts 2*(N+3) cycles and stops. The factor of two is needed because each control cycle includes a clock cycle for the least significant time-slice and a clock cycle for the most-significant time-slice. Also, the control cycles are arranged in pairs: for bit 1 of NC equal to 0 a multiple of X is selected, and for bit 1 of NC equal to 1 a multiple of M is selected.

When the multiply is done the multiplier busy flag is cleared. The result of the multiply will be: $P+C=(X*Y \mod M)+K*M$, where $-3<=K<=2$. The microprocessor waits N*4/16 device set clock cycles to allow all carries to flush into P, at which time the result will be: $P=(X*Y \mod M)+K*M$. Then the microprocessor "cleans up" the P register to get it in the range $0<=P<M$.

| COMMAND | HOW INVOKED | COMMAND DESCRIPTION |
|---|---|---|
| C. Clean-up Commands: | | |
| (if_P.ge.0_ then_P+C= P+C−M3) | Write TBD to CR, at addr TBD | If the P register is positive, then subtract 3*M. This command is used in "cleaning up" a product to get it in the range $0< = P<M$. |
| (if_P.lt.0_ then_P+C= P+C_M) | Write TBD to CR, at addr TBD | If the P register is negative, then add M. This command is used in "cleanup" of a product to get it in the range $0 <P<M>$. |
| (P+C=P+C+M) | Write TBD to CR, at addr TBD | Add M register to P register. This command is used to compute 3*M. |
| D. Input/Output Commands: | | |
| (load) | Write byte to TBD addr | Input 8 bits from microprocessor to LR register. Shift P register 8 bits left, and load 8 bits at least significant end of P from the LR register. |
| (unload) | Read byte from TBD addr | Output 8 msb's from P register to microprocessor. |
| (busy) | Read byte from TBD addr | Read the busy flag, which indicates multiplier is busy. |

An example, using the microprocessor commands described above, of how to perform the basic algorithm computation is given below.

In the following algorithm for the microprocessor, we assume that the variables are as follows:
b=base,
e=exponent,
m=modulus
lm=length of modulus and base,
le=length of exponent, and
lc=length of device set
are initially available, (Lengths are number of bits.) To avoid confusion, lower case letters are used for the variables of the microprocessor, and upper case for the registers of the device set.

The algorithms are presented in a pseudo-code format for each step of the computation. The microprogram commands are used to the device set as described above. These commands will always appear in parentheses, e.g. (load).

First, the modulus m is loaded the most-significant-bit first, into the P register, as shown in the following pseudo-code. It is assumed that m is stored as an array of bytes. It is also assumed that the wait-on-busy is needed only after the mutliply command.

```
(P+C=0)
for i = lm/8 − 1 down to 0 to begin
    (load) m[i]
end
```

The initial clearing of P and C assures that the extra bits at the left and right ends of the P register will be cleared. In general, one may have to load zeroes on the right in order to left-justify m in the P register. (All the lengths are multiples of eight). The following algorithm loads the necessary zeroes.

```
for i = 1 to (lc−lm)/8 do begin
        (load) 0
end
```

Then transfer m from the P register to the M register, compute 3*m, and load this into register M3.

```
(M=P)
(P+C=+C+M)
(P+C=P+C+M)
(M3=P)
```

Load the value lm=2 into the NR (cycle count) register. This is only needed if the arithmetic length differs from the previous calculation, or if this is the first calculation after power-up. Assuming that this value is in two bytes named nr[1] and nr[0], load the most-significent byte first, as follows:

```
(P+C=0)
(load) nr[1]
(load) nr[0]
(NR=P)
```

The length lm may also require truncation of the RY register. The truncation length is set up by the YC (Y configuration) register. This register is comprised of less than a byte in each device, but since the data is loaded via the P register, the data must be separated by dummy (zero) bytes. Assuming that the Y configuration data is in an array of bytes named ycd, one byte per device, and assuming that s_fill dummy bytes are needed per slave device (except for the most-significant slave) and m_fill dummy bytes are needed for the master device, the following procedure loads the Y configuration data:

```
(P+C=0)
for 1 = 4 down to 2 to begin
        (load) ycd[i]
        for j = 1 to s_fill do begin
                (load) 0
        end
end
(load) ycd[1]
for j = 1 to m_fill do begin
        (load) 0
end
(load) ycd[0]
(YC=P)
```

To permit even-valued exponents, set the RY register to one. For odd exponent values, this fragment of the procedure is not needed.

```
(P+C=0)
(load) 1
(RY=P,sel_SY)
```

In a fashion similar to the loading of m, load the base b into registers P, X, and SY.

```
(P+C=0)
for i = lm/8 − 1 down to 0 do begin
        (load) b[i]
end
for i=1 to (lc − lm)/8 do begin
```

```
        (load) 0
end
(X=P, SY=P, sel_RY)
```

This concludes the loading phase. The circuitry is now ready for the main calculation, which takes most of the time.

Use i to count exponent bits, j to count zero exponent bits, and k to count a pause of ft iterations of a program loop. This pause is to allow time to flush the saved carries into the P register. The minimum flush time is 1/16 of the multiplication time. A specific flush command is not needed, since this is what naturally happens when nothing (except carries) is added to the product register.

In the pseudo-code that follows, use the functions named "lsb" to examine the least-significant bit of the exponent, and "shr" to shift the exponent one bit to the right.

```
j = le/4
for i = 1 to le do begin
```

Initially, the P register holds the first power of the base, b to the power 1, which is associated with bit zero of the exponent. If the exponent is odd, Set RY=B, but if even, RY remains equal to 1. On other iterations of the loop, selectively set RY to the lastest square times the previous value of RY:

```
if lsb(e). eq. 1
then begin
        (RY=P,sel_SY)
end
else begin
        (sel_SY)
end
shr(e)
```

Notice that regardless of the "if" condition, always select the SL register next. Now, compute the next square by mulitiplying X times SY. Clear the P and C registers, start the basic multiplication cycle, and wait for it to complete, then "clean up" the modulo operation. Notice that at each step of the cleanup operation one must wait for the carries to flush into the P register.

```
(P+C=0)
(start_multiply:NC=NR)              —mult to compute square
while (busy) do nothing             —wait for mult to finish
(if_P.ge.0.-then-P+C=P+C−M)
for k = i to ft do nothing          -- flush carries
(if P.lt.0_then_P+C=P+C+M)
for k = 1 to ft do nothing          --flush carries
(if_P.lt.0_then-P+C=P+C+M)
for k= 1 to ft do nothing           --flush carries
(if_P.lt.0_then_P+C=P+C+M)
for K=1 to ft do nothing
(X=P,SY=P,sel RY)                   --load square to X and SY
```

The multiplication for the next R value is similar, except that one can sometimes skip this calculation. Leave the result in the P register when the calculation is done. The transfer of the result to the RY register is done at the top of the loop.

```
if lsb(e) .eq. 0 then j=j−1
```

-continued

```
if lsb(e) .eg. 1 or j ,lt, 0 then begin
  (p+C=0)
  (start_multiply:NC+NR) --mult to compute square
  while (busy) do nothing --wait for mult to finish
  (if_P.eg.0_then_P+C=P+C−M3)
  for k = 1 to ft do nothing --flush carries
  (if_P.lt.0_then_P+C=P+C+M)
  for k = 1 to fit do nothing --flush carries
  (if P.lt.0 then P+C=P+C+M)
  for k = 1 to ft do nothing --flush carries
  (if P.lt.0 then P+C=P+C+M)
  for k = 1 to ft do nothing --flush carries
  end
end
```

This is the end of the main loop. Now unload the result, which is always in the P register because the last exponent bit examined is always a one. The dummy load command shifts the P register left eight bits for the next unload.

```
r[0] = (unload)
for i = lm/8 − 1 down to 0 do begin
    (load)         --dummy load
    r[i] = (unload)
end
```

To erase the data left in the device set, add the following procedure:

```
(P+C=0)              --clear P
(X=P,SY=P,sel_RY)    --clear X and SY
(RY=P,sel_SY)        --clear RY
(M=P)                --clear M
```

In view of the above description, it is now seen that the structure depicted is capable of performing complicated mathematical computations which involve extremely long numbers and which computations are performed with increased speed and reduced circuit complexity. Hence the above described structure employs a common adder for the result (R) and square (S) accummulations. The adder is also used for adding multiples of both the modulus (M) and the multiplication factor (X). A product accumulator register (P) is shared and a separate register state result and square factor (RY and SY) are provided. This reduces the number of multiplexers. The basic logic circuit is "time sliced" thereby reducing the combinatorial logic by a factor of two. Three times the modulus is precalculated to enable support of an algorithm that allows reduction in the master control logic. The system utilizes the shift-and-add-carry capability to load all data and therefore in may instances latches are employed rather than more expensive flip/flops.

The logic circuits are partitioned so that all irregular logic is placed in the master device so that the slave devices have uniform circuitry. A microprocessor of a standard format affords control of the master and slave modules via a simple interconnect system and with a simple program design. Thus the resultant structure is less expensive and more quickly responsive to system requirements, thereby enabling one to utilize a reliable encryption technique at a minimum expense.

It is understood that the bit sizes for the various registers as well as for the various integers as given above are by way of example only, and the values can be changed to accommodate different arithmetic computations. In a similar manner the circuitry can be modified without departing from the spirit and scope of this invention as indicated by the claims appended hereto.

What is claimed:

1. Encryption apparatus for raising a large unsigned integer (B) indicative of message data to a large unsigned integer power (E), modulo a large unsigned integer M, with each of said integers being as large as N bits, where N is at least twenty one, wherein a resulting large unsigned integer C is adapted for transmission over an insecure communications channel, comprising:
   first logic means responsive to said large unsigned integer B for successively squaring said integer, including means for reducing said squared integer succesively by a given modules, to provide at an output a first value indicative of said squared integer as reduced by said given modules, wherein siad first logic means comprises a first register having an input for receiving said large unsigned integer (B) and an output coupled to a first modulo multipier means for successively squaring said integer and reducing said squared integer by said given modulus, with the output of said modulo-multiplier means coupled to the input of said first register to enable said first value to be stored therein, selectively operated gating means having one input adapted to receive a second value indicative of a given exponent power E and having another input coupled to said output of said first logic means,
   second logic means having input coupled to said gating means and operative as controlled by said gating means to provide an output value indicative of the product of said first value as further modified by modulus means including in said second logic means to provide at said outputs said resulting large unsigned integer (C) adapted to be transmitted over said insecure communications channel, wherein said second logic means comprises a second register having an input adapted to receive a first binary value, with an output of said second register coupled to the input of a second multiplier modulo means, with another input of said second modulo multiplier, and with the output of siad second modulo-multiplier means coupled to the input of said second register to cause it to store said large unsigned integer.

2. The encryption apparatus according to claim 1, wherein said binary input to said second register is a binary 1.

3. The encryption apparatus according to claim 1, further including a modulus register adapted to store therein a number indicative of said given modulus and having an output coupled to said first and second logic means for applying said given modulus thereto.

4. The encryption apparatus according to claim 1, wherein said first logic means further includes an arithmetic circuit having a first plurality of registers, one for storing therein values indicative of said modulus and one for storing said modulus as multiplied by a given factor and one for storing said large unsigned integer (B), multiplexer means coupled to said plurality of registers for selecting any one output of said plurality of registers, adder means having an input coupled to said multiplexer means and a second input responsive to said first value to provide at an output another successive value indicative of a modified first value.

5. Encryption apparatus for raising a large unsigned integer (B) indicative of message data to a large unsigned integer power (E), modulo a large unsigned integer M, with each of said integers being as large as N bits, where N is at least twenty one, wherein a resulting large unsigned integer C is adapted for transmission over an insecure communications channel, comprising:
- master logic means having a plurality of inputs and a plurality of outputs, with said master logic means including arithmetic computation means comprising a plurality of input devices for storing therein said large unsigned integer (B) and a given modulus, means coupled to said input devices to select a given one, multiplying means for multiplying the stored information in said selected devices with said large unsigned integer, register means for storing said multiplied information according to the least and most significant bits for providing storage of successive squares of said large unsigned number as reduced by said given modulus said master logic means further including means for generating command data,
- slave circuit means having a plurality of inputs coupled to said outputs of said master logic means for receiving selected data from said master logic means according to said stored information, and indicative of multiplied information, said slave circuit means including arithmetic computation means for successively multiplying said multiplied information according to said command data as generated by said master logic means,
- microprocessor means coupled to the input terminals of said master logic means and operative to provide a series of instructions to said master logic means indicative of the message data to be processed and the given modulus assigned to said data.

6. The encryption apparatus according to claim 5 wherein said master logic means includes clock generating means for controlling the operation of said arithmetic computation means and for providing on selected outputs timing waveforms for said slave circuit means.

7. The encryption apparatus according to claim 5, wherein said automatic computation means in both said master logic means and said slave circuit means includes first and second selectable registers, with said first register adapted to store the squared value of said large unsigned integer (B) as reduced by said given modulus and with said second register adapted to store an output value indicative of the product of said value stored in said first register as further modified by said given modulus.

8. The encryption apparatus according to claim 5, wherein said master logic means further includes a state register having an output coupled to said slave circuit means to indicate to said slave circuit means the computational state of said master logic means.

9. The encryption apparatus according to claim 5, wherein both said master logic means said slave circuit means include a partial product register adapted to store therein partial products resulting from said multiplications.

10. The encryption apparatus according to claim 9, wherein multiplying means includes first and second adders, said first adder adapted for adding carries and said second adder adapted to add values to said partial product register.

11. The encryption apparatus according to claim 5, wherein said master logic means further includes control circuitry adapted to receive a command signal from said microprocessor, a load register responsive to said command to cause said register to commence a shifting operation for controlling the operation of said arithmetic computation means.

12. The encryption apparatus according to claim 5, wherein said master logic means further includes a cycle-count register operative to store therein a count indicative of the number of multiplications performed by said multiplying means to control the number of products accumulated during a multiplication operation.

13. The encryption apparatus according to claim 5, wherein said master logic means further includes a control register adapted to receive commands from said microcprocessor means via the data bus.

14. The encryption apparatus for raising a large unsigned integer (B) indicative of message data to a large unsigned integer power (E), modulo a large unsigned integer (M) with each of said integers being as large as N bits, where N is at least twenty one, for transmitting a resulting modulo large unsigned integer (C) as encrypted data over an insecure communications channel, comprising
- first means having an input for receiving said large unsigned integer (B) indicative of message data and for providing said large unsigned integer at an output,
- first multiplier modulo means including means for storing a given modulus M having an input coupled to the output of said first means for providing at an output a signal indicative of the squared value of said message data (B) as reduced by a selected modulus, with said output of said first mulitplier modulo means coupled to the input of said first means to cause said first means to provide a sequence of squares modulo indicative of said modulo large unsigned integer (M)
- gating means having one input adapted to receive a valve indicative of said integer power (E) and another input coupled to the output of said first means,
- second means for storing a result indicative of the product of selected squares modulo, said second means having an output and an input adapted to receive a given binary value,
- second multiplier modulo means including means for storing said given modulus having a first input coupled to said gating means and a second input coupled to the output of said second means for providing at an output a value indicative of the product of the values stored in said first and second means as controlled by said gating means and with said product reduced by the modulus, with the output of said second multiplier modulo means coupled to the input of said second means, whereby said second means has stored therein said resulting modulo large unsigned integer (C) for transmission over said communications channel.

15. The encryption apparatus according to claim 14, wherein said first multiplier modulo means includes a partial product register means for storing partial products of said squared value of said message data as reduced by said selected modulus, with said product register capable of storing said values according to the most and least significant bits.

16. The encryption apparatus according to claim 15, wherein said first and second modulo means each are adapted to time share said partial product register.

17. The encryption apparatus according to claim 14, whrein said encryption apparatus further includes a microprocessor having output data lines coupled to said first and second multiplier modulo means for providing said large unsigned integer and said given binary value and for directing a series of commmands to said first and second means operative to control the respective multiplications.

18. A method for raising a large unsigned integer (B) to a large unsigned integer power (E) (exponent), modulo a large unsigned integer (M), with each of said integers being as large as N bits, where N is at least twenty one, comprising the steps of:
  (a) storing said large unsigned integer (B)
  (b) squaring said stored value
  (c) reducing said squared value by the modulus M to obtain a value S
  (d) providing a product of selected squares, Modulo M
  (e) multiplying said product of selected squares, modulo M by said value S according to a given value of an exponent bit (E) to obtain a value X
  (f) reducing said value X by said modulus M to produce a value R
  (g) storing said value R indicative of said large unsigned integer M.

* * * * *